United States Patent [19]

Iwasaki

[11] 3,869,722

[45] Mar. 4, 1975

[54] AUTO CASSETTE CHANGER

[75] Inventor: Tadahisa Iwasaki, Saitama, Japan

[73] Assignee: Pioneer Electronic Corporation, Ohta-Ku, Tokyo, Japan

[22] Filed: Oct. 26, 1972

[21] Appl. No.: 300,951

[30] Foreign Application Priority Data

| | | |
|---|---|---|
| Oct. 26, 1971 | Japan | 46-84954 |
| Oct. 26, 1971 | Japan | 46-99413 |
| Oct. 26, 1971 | Japan | 46-99414 |

[52] U.S. Cl. .................................. 360/92, 360/105

[51] Int. Cl. .......................................... G11b 23/12

[58] Field of Search ...... 274/4 F, 4 G; 179/100.2 Z; 360/92, 96, 105

[56] References Cited

UNITED STATES PATENTS

| | | | |
|---|---|---|---|
| 3,672,686 | 6/1972 | Ban | 274/4 F |
| 3,690,587 | 9/1972 | Kitazawa | 274/4 F |
| 3,756,608 | 9/1973 | O'Neill et al. | 274/4 F |

*Primary Examiner*—Richard E. Aegerter
*Assistant Examiner*—John W. Shepperd
*Attorney, Agent, or Firm*—Sughrue, Rothwell, Mion, Zinn & Macpeak

[57] ABSTRACT

An auto cassette changer is provided with a cassette table movable forwardly and rearwardly relative to the front of a cassette tape drive mechanism having reel shafts projecting horizontally therefrom. During forward movement of said cassette table the forwardmost tape cassette is shifted longitudinally on said cassette table into engagement with said cassette tape drive mechanism and during rearward movement of said cassette table the cassette is disengaged from the drive mechanism and removed from said cassette table by dropping downwardly through an opening in the table to a cassette receiving platform for storage.

3 Claims, 6 Drawing Figures

AUTO CASSETTE CHANGER

BACKGROUND OF THE INVENTION

1. Field of the Invention

This invention relates to an auto cassette changer which automatically exchanges one casette for another and shifts the cassettes with respect to a cassette tape drive mechanism for successive recording or reproducing.

2. Prior Art

Conventional automatic cassette changers have a structure wherein a tape cassette is moved a relatively long distance or a cassette tape drive mechanism is designed to move, so that they had the drawback of structural complexity as a whole. In the case of the structure wherein the cassette tape drive mechanism was moveable, there was the unavoidable shortcoming that recording or reproducing was unstable.

SUMMARY OF THE INVENTION

The present invention has been worked out in view of the aforementioned circumstances, and it is an object to provide an auto cassette changer which includes a fixed cassette tape drive mechanism and simply effects exchange of tape cassettes by only a slight forward and rearward movement of a cassette table on which the tape cassettes are disposed and arranged longitudinally.

It is a further object of the present invention to provide an arrangement for the removal of a used tape cassette wherein the tape cassette adjacent the tape drive mechanism will be selectively dropped downwardly through an aperture to allow the next cassette on the table to be advanced forwardly into engagement with the tape drive mechanism for recording or reproducing.

It is still a further object of the present invention to provide a storage platform immediately below the cassette table for receiving and storing a plurality of tape cassettes which are dropped downwardly from the tape drive mechanism. A shifting mechanism is provided to make room for each subsequently dropped cassette.

The present invention will now be described minutely with reference to an embodiment shown in the drawing.

Figure 1:
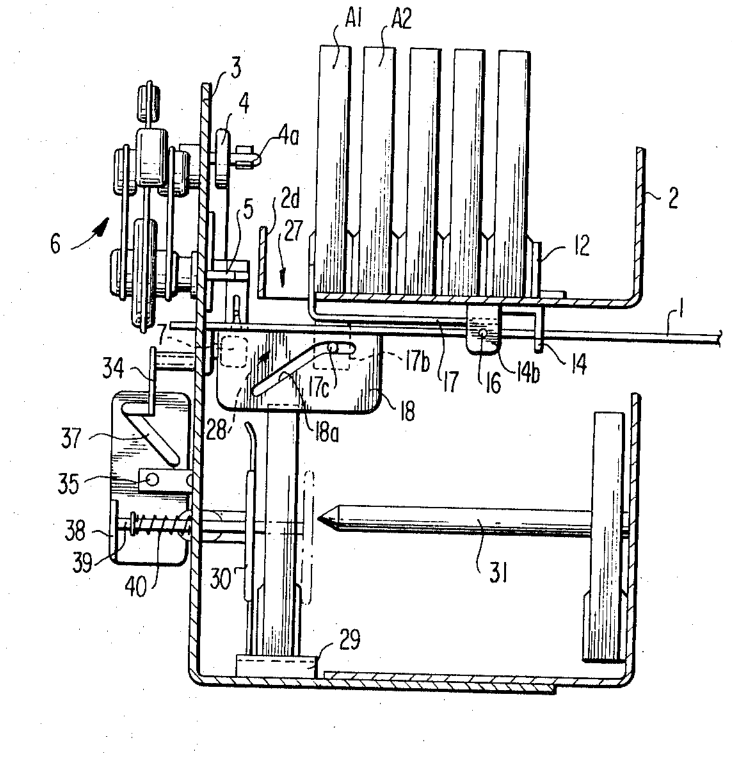
FIG. 1 is a longitudinal side view of an embodiment of the present cassette changer.

In the figures, reference number 1 designates a horizontally extending chassis on which mutually parallel L-shaped guide rails 1*a*, 1*a* are secured in the fore and aft directions. On the chassis 1 a box-like cassette table 2 is disposed having an open front portion. L-shaped sliders 2*a*, 2*a* are mounted on the underside of the table along either side thereof and are slidably received by the guide rails 1*a*, 1*a*, so that the table can move forwardly and rearwardly along the guide rails.

In front of the cassette table 2 a cassette tape drive mechanism is provided. A tape deck 3 is secured upright to the front of chassis 1 having reel shafts 4*a* with reel bases 4 facing the cassette table 2. A capstan shaft 5 also projects from the tape deck 3 and can be driven together with the reel shafts 4*a* by means of a separately provided drive system 6.

There is an opening in the chassis 1 below the cassette table 2, in which a swingable lever 9 is provided which has a record/playback head 7 and a pinch roller 8. The swingable lever 9 has one end pivoted to a pin 10 and the other end pivoted to a rod 11*a* of a solenoid 11.

The cassette table 2 is formed with slots 2*b*, 2*b* in both side walls extending in the fore and aft direction, and is provided with guide rods 2*c*, 2*c* extending in the fore and aft direction externally of the slots 2*b*, 2*b*. Inside the cassette table 2 there is provided a strip pusher 12 extending from side to side. The end portions of the strip pusher pass through the slots 2*b*, 2*b* and are slidably supported by the guide rods 2*c*, 2*c*. Around the guide rods 2*c*, 2*c* there are mounted compression coil springs 13, 13 which urge the pusher 12 toward the cassette tape drive mechanism. Therefore, the tape cassettes A1, A2, . . . disposed and arranged longitudinally on the cassette table 2 are pushed toward the front by the pusher 12 and maintained in the biased condition with respect to supporting portions 2*d*, 2*d* which are inwardly bent portions at the front of the side portions of the cassette table 2.

On the undersurface of the cassette table 2 adjacent its rear section, an L-shaped interacting member 14 is supported for movement in the fore and aft direction the rear margin of which is bent downward. The interacting member 14 is formed with a slot 14*a* in which a pin 15 projecting from the base portion of the cassette table 2 is slidably inserted, whereby the pin 15 limits the relative movement in the fore and aft direction of the interacting member 14 with respect to the cassette table 2.

The interacting member 14 has a bearing portion 14*b* upon which a trapezoidal board-like separator member 17 is pivoted by a pin 16. The separator member 17 is formed in the vicinity of either side in the frontal end thereof with separating claws 17*a*, 17*a* which are upwardly bent portions of the member which are so dimensioned as to engage the frontal side portions of the cassette. From the side portions of the separator member 17 tongue elements 17*b*, 17*b* project downwardly, pins 17*c*, 17*c* are supported rotatably on the tongue elements, flange members 18 are provided on the underside of the chassis 1 and extend downwardly therefrom. Members 18 have a substantially L-shaped curved slot 18*a* which function to slidable guide the pin 17*c*. Thus, as the cassette table 2 moves forward the pins 17*c* move downward along the slots 18*a* whereby the separating claws 17*a*, 17*a* move down beyond the cassette table 2, whereas as the cassette table 2 moves rearward the pins 17*c* move up along the slots 18*a* so that the separating claws 17*a*, 17*a* can move upward above the level of the cassette table 2.

On the underside of the cassette table 2 there is provided a lever 20 which is pivotably supported at its midpoint by a pin 19, which is biased by a pull spring 21 so that a distal portion 20*a* of the lever 20 is pushing rearwardly the rear bent portion 14*c* of the interacting member 14. Below the cassette table 2, a stop pin 22 is provided on the chassis 1 in opposition to and behind the other end portion 20*b* of the lever 20.

The chassis 1 also has another solenoid 23 mounted thereon and having a rod 23*a* which is coupled to a lever 24. The lever 24 is pivoted through a pin 25 to the chassis 1 where one end of the lever engages the rear portion of the cassette table 2 so as to urge the table rearwardly. Also, the cassette table 2 is biased by a spring 26 so that it is always pulled forwardly.

The cassette table 2 is formed in its frontal base portion with a drop down slot 27 through which the forward-most tape cassette can pass downwardly. A similar passage 28 is formed in the chassis 1, below which a cassette receiving platform 29 is provided. The cassette receiving platform 29 has projections positioned at appropriate locations to catch the case member of the tape cassette as it comes down, whereby the danger that recording/reproducing elements of the cassette will collide with the cassette receiving platform 29 thereby damaging the inner tape and the like can be effectively obviated. There is also provided a pusher 30 to push and move rearward the tape cassette deposited on the cassette receiving platform 29. Supporting posts 31, 31 are provided extending horizontally from the rear to the front portion which will fit in the reel holes of the tape cassette. To ensure that the tape cassette comes down and is guided correctly onto the cassette receiving platform 29, guide walls 32 are provided around the cassette receiving platform 29.

A mechanism 33 for driving the pusher 30 rearward is provided and designed so that it is operated by a swingable lever 34 having one end intercoupled with the rod 11*a* of the solenoid 11. The other end of the swingable lever 34 is inserted in an inclined slot 37 of a push lever 36 pivoted to a shaft 35. The lever 36 has a bent portion 38 and a push lever 39 integral with the pusher 30 is urged by a spring 40 provided thereabout.

Figures 3, 4, 5, 6:
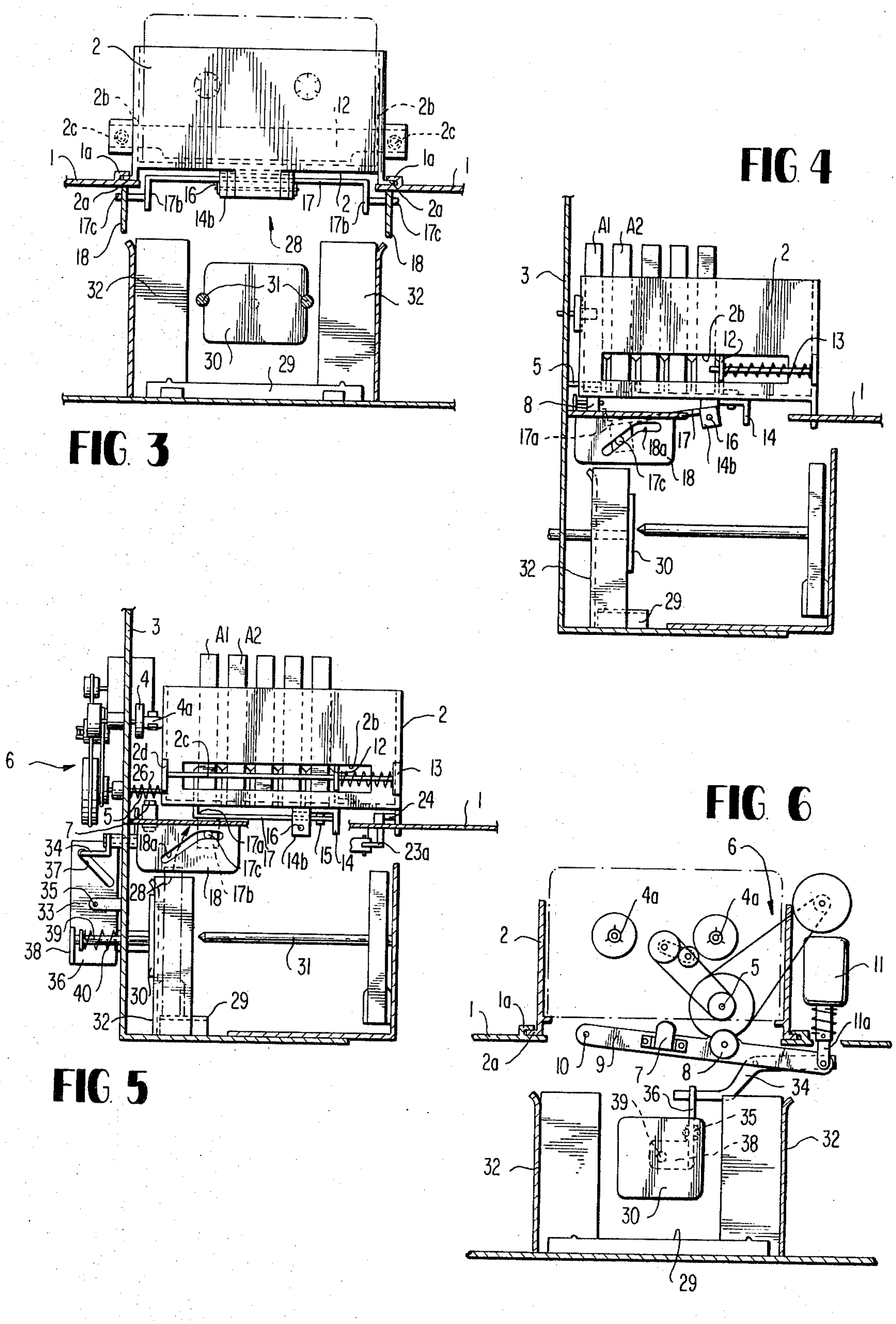
FIG. 3 is a rear view.
FIG. 4 is a longitudinal side view of a cassette tape drive mechanism with a cassette set therein.
FIG. 5 is a longitudinal side view corresponding to FIG. 4 with the cassette released.
FIG. 6 is a front view showing the cassette tape drive mechanism.

In the foregoing arrangement, if solenoid 23 is deenergized, the cassette table 2 is pulled forward by action of the spring 26 whereby the forward-most tape cassette A1 is moved to the position shown in FIG. 4 where its reel holes are in engagement with the reel shafts 4*a*. In this condition, when the solenoid 11 is excited, the pinch roller 8 moves up and pinches the tape between it and the capstan shaft 5, so that in response to rotation of the capstan shaft 5 and reel shafts 4 the tape is advanced, during which a recording or reproducing operation can be effected through the head 7 which has come up into engagement with the tape. At this time, the separating claws 17*a*, 17*a* are positioned below the cassette table 2 because the pins 17*c* have come down along the slots 18*a*, the tape cassette is in the forwardly pushed position by the spring 13, and the tape cassette A1 is held in tha stable manner on the deck 3.

Figure 2:
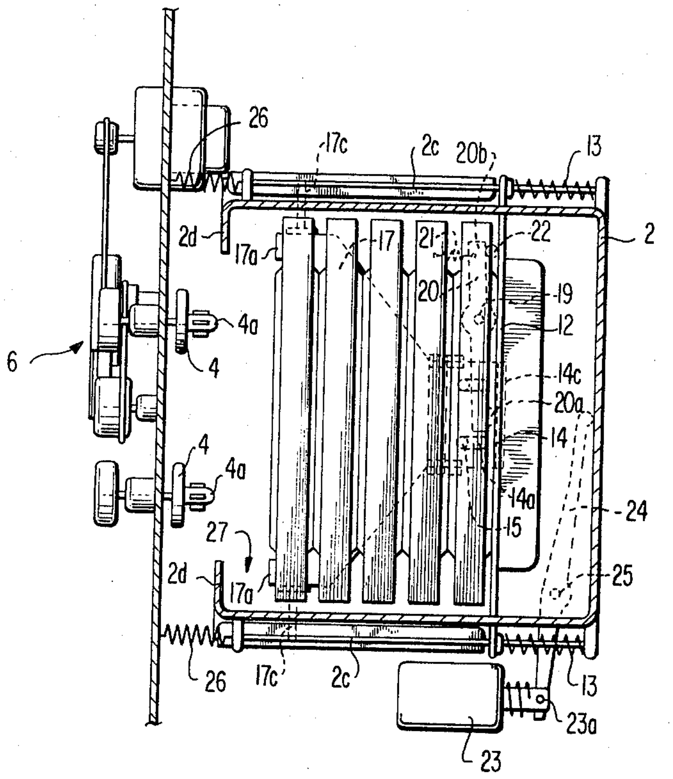
FIG. 2 is a plan view.

When the recording or reproducing operation with respect to the tape cassette A1 is completed, the solenoid 11 is deenergized and in response thereto the head 7 and pinch roller 8 move down. As the solenoid 23 is again energized the cassette table 2 is pulled rearward to the position shown in FIGS. 2 and 5 by means of the lever 24. Using this rearward movement the drop-down slot 27 shifts to the position where it is in line with the passage 28 and the separating claws 17*a*, 17*a* again move up and force themselves between the first tape cassette A1 and the second tape cassette A2. At this position, the first tape cassette A1 is held between portions 2*d*, 2*d* of the cassette table and the claws 17*a*, 17*a* which are pushed forwardly by the spring biased pusher 12 which forces the other cassettes against the claws. The end portion 20*b* of the lever 20 will abut against the stop pin 22 and the interacting member 14 upon which the separation member 17 is pivoted will move rearward in opposition to the action of the spring 13, in relation to the cassette table 2 within the moveable extent of the pin 15 engaged in the slot 14*a* to the position shown in FIG. 2. Therefore, the separator member 17 moves rearwardly in relation to the cassette table 2, pushes rearwardly by means of its separating claws 17*a* the second cassette A2 and succeeding cassettes, and releases the first cassette A1 previously sandwiched between the supporting portions 2*d*, 2*d* and the second cassette A2. Accordingly, the first cassette A1 drops down freely by its weight through the slit 27 and the passage 28 onto the cassette receiving platform 29.

If energization of the solenoid 23 is then removed, the cassette table 2 moves forward, the other end portion 20*b* of the lever 20 comes out of engagement with the stop pin 22, the interacting member 14 moves forward by the force of the spring 13 acting through pusher 12, the cassettes and the separator 17, within the operable extent of the pin 15 defined by the slot 14*a*, returning to the initial stand-by position, and the separating claws 17*a* move down below the cassette table 2 as the pins 17*c* move along the slits 18*a*. Thus, the second cassette A2 is advanced forwardly together with the succeeding cassettes by the pusher 12 up to the position where the former abuts upon the supporting portions 2*d*. As a result, the then forward-most tape cassette is disposed in the position where recording or reproducing can be started with the reel shafts 4*a* inserted in the reel holes.

Then, if the solenoid 11 is energized to the effect recording or reproducing a second time, the new tape cassette A1 (originally, the second one) is put in the working position, whereas the initial cassette A1 now on the cassette receiving platform 29 is removed from the cassette receiving platform 29 and the supporting posts 31, 31 penetrate the reel holes because the push lever 36 pivots in response to movement of the swingable lever 34 and the pusher 30 is caused to move in opposition to the spring 40.

Through repetition of the foregoing operation, the tape cassettes are automatically exchanged.

What is claimed is:

1. An automatic cassette changer device comprising a chassis, a tape drive mechanism secured to said chassis, cassette table means movably mounted on said chassis for holding a plurality of tape cassettes, pusher means for shifting said cassettes toward said tape drive mechanism for engagement of a first cassette with said tape drive mechanism, shift means for moving said table means away from said tape drive mechanism, aperture means formed in said table means and said chassis permitting the downward passage of the first cassette upon shifting of said table means away from said tape drive mechanism, platform means disposed beneath said aperture means for receiving a dropped cassette thereon and means for selectively holding and releasing the remaining cassettes during and subsequent to the dropping operation of a cassette.

2. An automatic cassette changer device as set forth in claim 1 further comprising holding means on said platform means for storing a plurality of dropped cassettes and means for shifting the dropped cassette from its position below said aperture means into engagement with said holding means.

3. An automatic cassette changer device as set forth in claim 1 wherein said means for selectively holding and releasing the remaining cassettes during and subsequent to a dropping operation is comprised of a lever pivotally mounted beneath said table means, said lever having upstanding tab means thereon for engaging the face of a cassette and means for pivoting said lever means to bring said tab means into and out of engagement with the face of a cassette.

* * * * *